(12) United States Patent
Simescu et al.

(10) Patent No.: US 6,443,104 B1
(45) Date of Patent: Sep. 3, 2002

(54) ENGINE AND METHOD FOR CONTROLLING HOMOGENOUS CHARGE COMPRESSION IGNITION COMBUSTION IN A DIESEL ENGINE

(75) Inventors: Stefan Simescu; Thomas W. Ryan, III, both of San Antonio; Daniel W. Dickey, Helotes, all of TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/738,446

(22) Filed: Dec. 15, 2000

(51) Int. Cl.$^7$ .................................................. F02B 47/00
(52) U.S. Cl. .................................. 123/25 J; 123/25 C
(58) Field of Search ............................. 123/25 C, 25 J

(56) References Cited

U.S. PATENT DOCUMENTS

| | | | |
|---|---|---|---|
| 4,884,533 A | | 12/1989 | Risitano et al. |
| 5,125,366 A | * | 6/1992 | Hobbs ..................... 123/25 C |
| 5,832,880 A | | 11/1998 | Dickey |
| 5,875,743 A | | 3/1999 | Dickey |
| 6,286,482 B1 | * | 9/2001 | Flynn et al. .............. 123/25 C |

* cited by examiner

*Primary Examiner*—Noah P. Kamen
(74) *Attorney, Agent, or Firm*—Oliff & Berridge, PLC

(57) ABSTRACT

An operating characteristic representative of a first stage reaction in HCCI combustion is sensed and used as a control event for injecting water into the combustion chamber to delay the start of combustion of the primary HCCI reaction.

8 Claims, 4 Drawing Sheets

ENGINE AND METHOD FOR CONTROLLING HOMOGENOUS CHARGE COMPRESSION IGNITION COMBUSTION IN A DIESEL ENGINE

BACKGROUND OF THE INVENTION

1. Technical Field

This invention relates generally to a diesel engine adapted for operation in a homogenous charge compression ignition (HCCI) combustion mode and to a method for controlling HCCI combustion in a diesel engine, and more particularly, to such an engine and method that uses water injection to control the start of combustion in the HCCI mode.

2. Background Art

Homogenous charge compression ignition (HCCI) is a combustion mode in which a homogenous air-fuel mixture starts reaction in an engine combustion chamber when the full auto-ignition temperature is reached within the mixture. The reaction is initiated throughout the entire mixture, i.e., multi-point ignition, and proceeds without a visible flame front. U.S. Pat. No. 5,875,743 granted Mar. 2, 1999, to Daniel W. Dickey, one of the co-inventors of the present invention, titled APPARATUS AND METHOD FOR REDUCING EMISSIONS IN A DUAL COMBUSTION MODE DIESEL ENGINE, and assigned to the assignee of the present invention, describes the control of diesel engine emissions in a diesel engine adapted for at least partial operation in an HCCI combustion mode. U.S. Pat. No. 5,875,743 proposes the use of two fuel injectors, and optionally a water injector, for respective fuel and water injection based on engine operating parameters indicative of engine speed and load. U.S. Pat. No. 5,832,880 granted Nov. 10, 1998, also to Daniel W. Dickey, for an APPARATUS AND METHOD FOR CONTROLLING HOMOGENOUS CHARGE COMPRESSION IGNITION COMBUSTION IN DIESEL ENGINES, and likewise assigned to the assignee of the present invention, also describes controlling HCCI combustion by water injection.

However, there remain problems in providing a more precise control of HCCI combustion. More particularly, controlling the HCCI combustion process has presented two significant challenges:

1) controlling the combustion phasing with respect to the top dead center (TDC) position of a piston reciprocatively disposed in the combustion chamber, and 2) controllably extending the operating range of HCCI combustion into high engine loads.

The present invention is directed to overcoming the problems of controlling HCCI combustion with respect to TDC and extending HCCI combustion to high engine load conditions.

SUMMARY OF THE INVENTION

In accordance with one aspect of the present invention, a method for controlling homogenous charge compression ignition combustion in a diesel engine includes sensing pressure in the combustion chamber, sensing the angular position of the crankshaft with respect to a TDC position of a piston disposed in the combustion chamber, and calculating the values of a combustion chamber pressure derivative with respect to the crankshaft angle at a first time and at a subsequent second time. The change in values of the combustion chamber pressure derivative with respect to the crankshaft angle at the second time is compared with that of the first time, and a signal is delivered to a trigger circuit in response to the value of the combustion chamber pressure derivative with respect to the crankshaft angle at the second time being less than the value of the combustion chamber pressure derivative with respect to the crankshaft angle at the first time. Water is injected into the combustion chamber in response to the trigger circuit delivering a signal to a water injector.

In accordance with another aspect of the present invention, a method for controlling homogenous charge compression ignition combustion in a diesel engine includes sensing an operating characteristic representative of a first combustion stage. The injection of water into the combustion chamber subsequent to sensing the operating characteristic representative of the first combustion stage. Injecting water is carried out at a time, and for a length of time, sufficient to delay the start of a second combustion stage until a piston disposed in the combustion chamber is at a preselected position.

In accordance with yet another aspect of the present invention, a diesel engine adapted for at least partial operation in a homogenous charge compression ignition combustion mode has a means for sensing pressure in a combustion chamber of the engine, a means for sensing crankshaft angle, and a differentiator operatively connected to the means for sensing pressure in the combustion chamber and to the means for sensing crankshaft angle. A comparator is adapted to receive a signal from the differentiator, and a trigger circuit is adapted to receive a signal from the comparator. The diesel engine also includes an injector operatively connected to a source of water and adapted to inject water into the combustion chamber in response to receiving a signal from the trigger circuit.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

Figure 1:
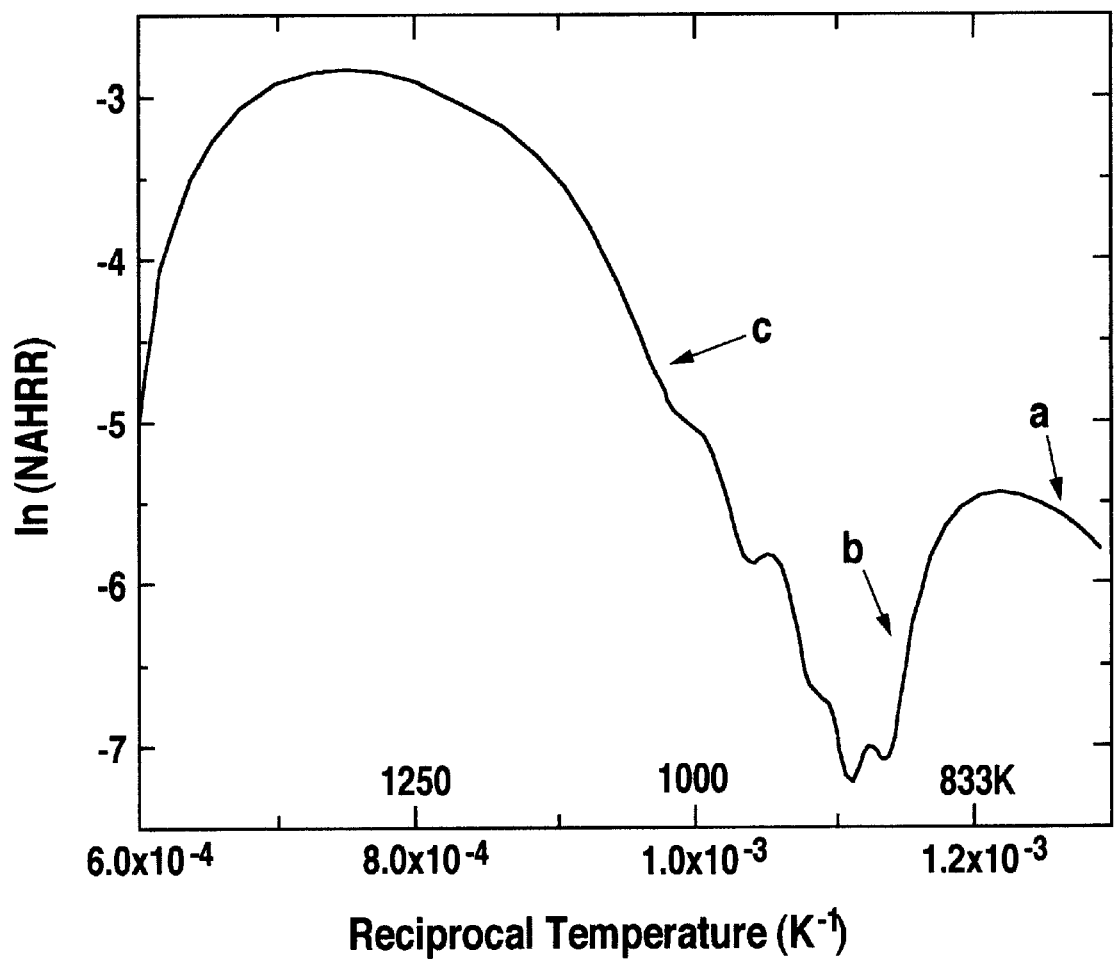
FIG. 1 is a graphical representation of the natural logarithm of the normalized apparent heat release rate (NAHRR) with respect to the reciprocal mass-average gas temperature for typical diesel fuel combustion in an HCCI mode.

As noted above, homogenous charge compression ignition (HCCI) is a combustion mode in which a homogenous air-fuel mixture starts reacting in the engine cylinder when the fuel auto-ignition temperature is reached within the mixture. As also noted, the reaction is initiated throughout the entire mixture and proceeds without a visible flame front. It has now been discovered that HCCI combustion, for a typical paraffinic diesel fuel, exhibits a two-stage character as shown by the graph of the logarithm of the normalized apparent heat release rate (NAHRR) vs. reciprocal mass average gas temperature, as illustrated in FIG. 1. This discovery is described on pages 126–133 of a 1997 dissertation submitted by Stefan Simescu, a co-inventor of the present invention, in partial fulfillment of the requirements for the degree of Doctor of Philosophy (mechanical engineering) at the University of Wisconsin-Madison.

With continued reference to FIG. 1, the discovery identified a first stage, indicated as Region a in FIG. 1, which has a small energy release representing about 5% of the total fuel energy, which is followed by a negative temperature coefficient, identified as Region b in FIG. 1. The bulk fuel energy is released during a second, or main stage, of combustion, identified as Region c at high rates of heat release which account for approximately 95% of the total energy release.

While the HCCI combustion mode can result in very low $NO_x$ and particulate matter (PM) emissions, the start of reaction is temperature dependent, and therefore not controlled. Furthermore, the engine load, as measured by the equivalence ratio, is limited to light loads when the start of reaction is not controlled, as the heat release rate (HRR) becomes unacceptably high at higher equivalence ratios. "Equivalence ratio" is commonly defined as the ratio in which the numerator is the fuel consumption divided by air consumption as actually measured, and the denominator is the stoichiometric fuel/air ratio. Thus, light loads would have a relatively low equivalence ratio, whereas high loads would have a higher ratio. Methods have been proposed, as described in the above-referenced U.S. Pat. Nos. 5,832,880 and 5,875,743 to control the start of the first stage of HCCI reaction, as indicated at Region A in FIG. 1.

Figure 2:
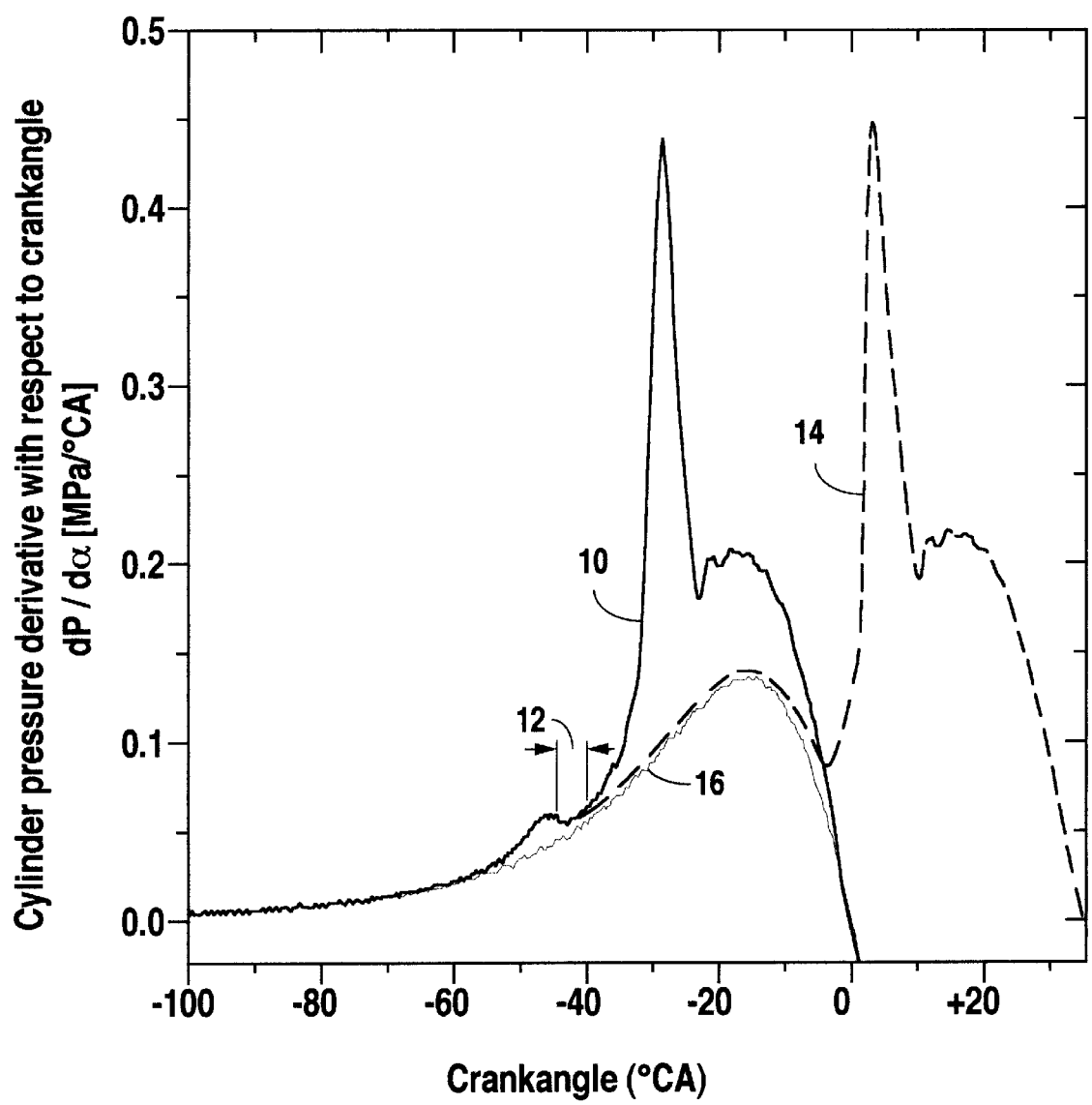
FIG. 2 is a graphical representation of the cylinder pressure derivative with respect to crankangle in a combustion chamber without fuel injection, with uncontrolled HCCI combustion and with HCCI combustion controlled in accordance with the present invention.

The present invention is directed to controlling the start of the second stage combustion, represented by Region C in FIG. 1, which releases about 95% of the total fuel energy. The present invention is simultaneously directed at maintaining an acceptable heat release rate (HRR) at higher equivalence ratios. Since the start of the second stage is also temperature dependent, as noted in the above-referenced doctoral dissertation, it is desirable to move the start of combustion (SOC) of the second stage to a position at, or preferably just immediately prior to, the top dead center (TDC) position of a piston in the combustion chamber. With reference to FIG. 2 (graph), the cylinder pressure derivative with respect to crankangle ($d_p/d_\alpha$) is indicated by a solid line 10 and illustrates a representative premature start of second stage combustion in uncontrolled HCCI combustion at relatively high engine loads. In an uncontrolled HCCI combustion mode, the start of second (main) stage combustion may start as early as 40° BDTC, thereby producing combustion at an undesired piston position, i.e., before the piston reaches the TDC position. By the present invention, water is injected directly into the cylinder during a time, indicated by the area 12 in FIG. 2 and described below in greater detail, to delay the start of the second stage combustion, as represented by dashed line 14 until desirably, about 1° to 3° BDC. The short-dash line 16 represents the cylinder pressure derivative with respect to crankangle ($d_p/d_\alpha$) of a cylinder in which no fuel is injected and no combustion occurs, and is simply referred to as a motoring mode.

In the present invention, the controlled shift of the SOC of main, or second, stage HCCI combustion to the right, to a position closer to the zero crankangle is achieved by direct in-cylinder water injection during the period 12. Preferably, the direct in-cylinder water injection is carried out by a multi-hole nozzle which generates water plumes within the homogenous mixture in the cylinder. Water plume vaporization will result in lowering the fuel/air mixture temperature, both locally in the solid angle of the water plumes, as well as overall in the combustion chamber. Thus, the start of second-stage reaction will be controlled by the timing and amount of water injected during the period 12 immediately following the first stage reaction. The heat release rate at higher loads (equivalence ratios) will be controlled by the non-uniformity in the temperature field, i.e., with lower temperatures in the plume regions, as the colder water plume regions start reaction at a slightly later time. Although the reaction is no longer homogenous throughout the entire combustion chamber, local homogeneity is still maintained. As a result, low $NO_x$ and PM emissions are obtained, even at higher loads, while the fuel efficiency of the engine is preserved by controlling the start of the second stage of HCCI combustion. As discussed below in greater detail, a method 18 for controlling the start of combustion of the second stage is outlined by flow diagrams in FIG. 3, for a diesel engine 20 adapted for at least partial HCCI combustion mode operation as illustrated in FIG. 4.

Figure 4:
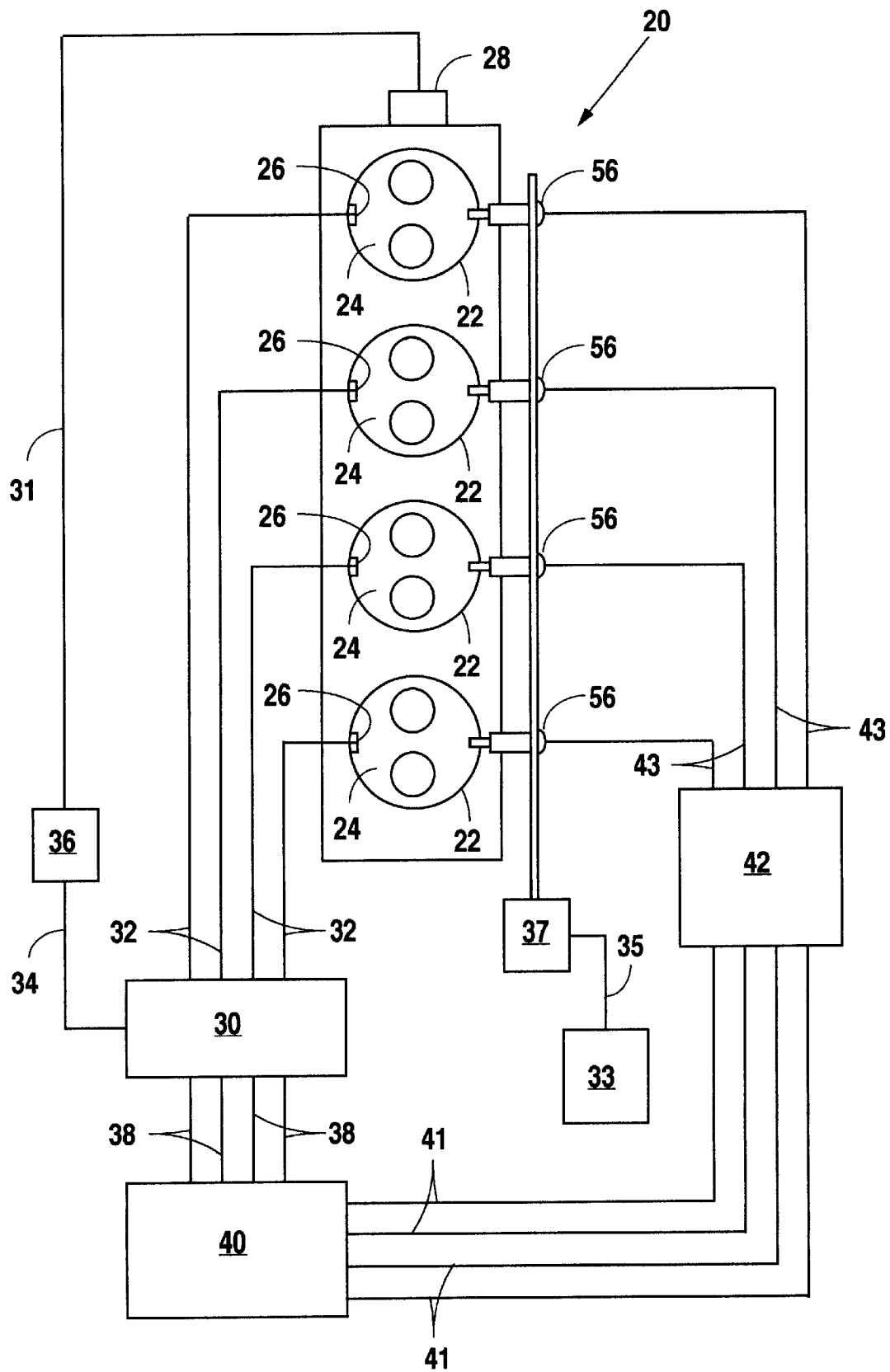
FIG. 4 is a schematic diagram of an HCCI combustion controlled diesel engine in accordance with the present invention.

With specific reference to FIG. 4, the diesel engine 20, embodying the present invention, has at least one, and typically a plurality, of combustion chambers 22 with a piston 24 reciprocatively disposed in each of the combustion chambers 22 and operatively connected to a crankshaft, not shown. The engine 20, in order to be controlled by the method 18 embodying the present invention, has a means 26 for sensing pressure in the combustion chamber 22 and a means 28 for sensing crankshaft angle. The means 26 for sensing pressure in the combustion chamber 22 may comprise a Kistler model 7061, water cooled, piezoelectric pressure transducer, as described on pages 66–81 of the above-referenced doctoral dissertation. Other combustion chamber pressure sensing devices, either communicating directly with the combustion chamber, or mounted on an external surface, e.g., as a piezoelectric washer under a head bolt, may also be used in carrying out the control method embodying the present invention. The means 28 for measuring crankshaft angle includes conventional crankshaft angle sensors which either optically or magnetically detect one or more pre-identified indicants of crankshaft position.

The engine 20 further includes a first comparator 36 adapted to receive a signal 31 representative of the crankshaft position from the crankangle position sensor 28, and a differentiator 30 operatively connected to the means 26 for sensing pressure in the combustion chamber 22 and to the comparator 36. The differentiator 30 includes electronic circuitry capable of receiving a signal 32 from each of the combustion chamber pressure sensing means 26 that is representative of the pressure (p) present in the respective combustion chamber. A signal 34 from the first comparator 36 is delivered to the differentiator 30 when the crankshaft position angle ($\alpha$) is within a preselected position range, e.g., less than 60° BTDC. The differentiator 30 circuitry calculates the combustion chamber pressure derivative with respect to the crankshaft angle ($d_p/d_\alpha$) when the crankshaft position angle ($\alpha$) has a value within the preselected range before top dead center (BTDC) position of the piston 24, e.g., 60° BTDC.

The engine 20 further includes a second comparator 40 which receives signals 38 from the differentiator 30, representative of the calculated combustion chamber pressure derivatives with respect to the crankshaft angle ($d_p/d_\alpha$). The second comparator 40 compares each of the calculated combustion chamber pressure derivative with respect to the crankshaft angle values ($d_p/d_\alpha$) at a first time (t), represented by the mathematical expression $(d_p/d_\alpha)_t$, with each of the calculated combustion chamber pressure derivatives with respect to the crankangle values at a subsequent second time (t+1), represented by the mathematical expression $(d_p/d_\alpha)_{t+1}$.

The engine 20 further includes a trigger circuit 42 which receives a signal 41 from the second comparator 40 in response to the calculated combustion chamber pressure derivative with respect to crankshaft angle at the second time being less than the calculated combustion chamber pressure derivative with respect to crankshaft angle at the first time, i.e.; $(d_p/d_\alpha)_{t+1} < (d_p/d_\alpha)_t$. Desirably, the trigger circuit 42 includes both a delay circuit to delay the start of water injection, depending upon engine speed and load, to a desired period of time within the area 12 indicated on FIG. 2, and an injection duration circuit to control the length of water injection into the cylinder for a period of time sufficient to shift the start of combustion of the HCCI main combustion reaction to a point near TDC. Preferably, the trigger circuit 42 transmits a control signal 43 which controls the initiation and duration of water injection until a time, and for a duration of time, sufficient to delay HCCI second stage reaction until the piston 24 is in a range of from about 3° BTDC to about 0–5° BTDC. A multi-orificed water injector 56 is in communication with each of the combustion chambers 22. The operation of the water injectors 56 is respectively controlled by the control signal 43 transmitted by the trigger circuit 42. A high pressure water injection pump 33 has a line 35 to a water pressure regulator 27. The water pressure regulator 27 is in direct fluid communication with each of the injectors 56.

Figure 3:
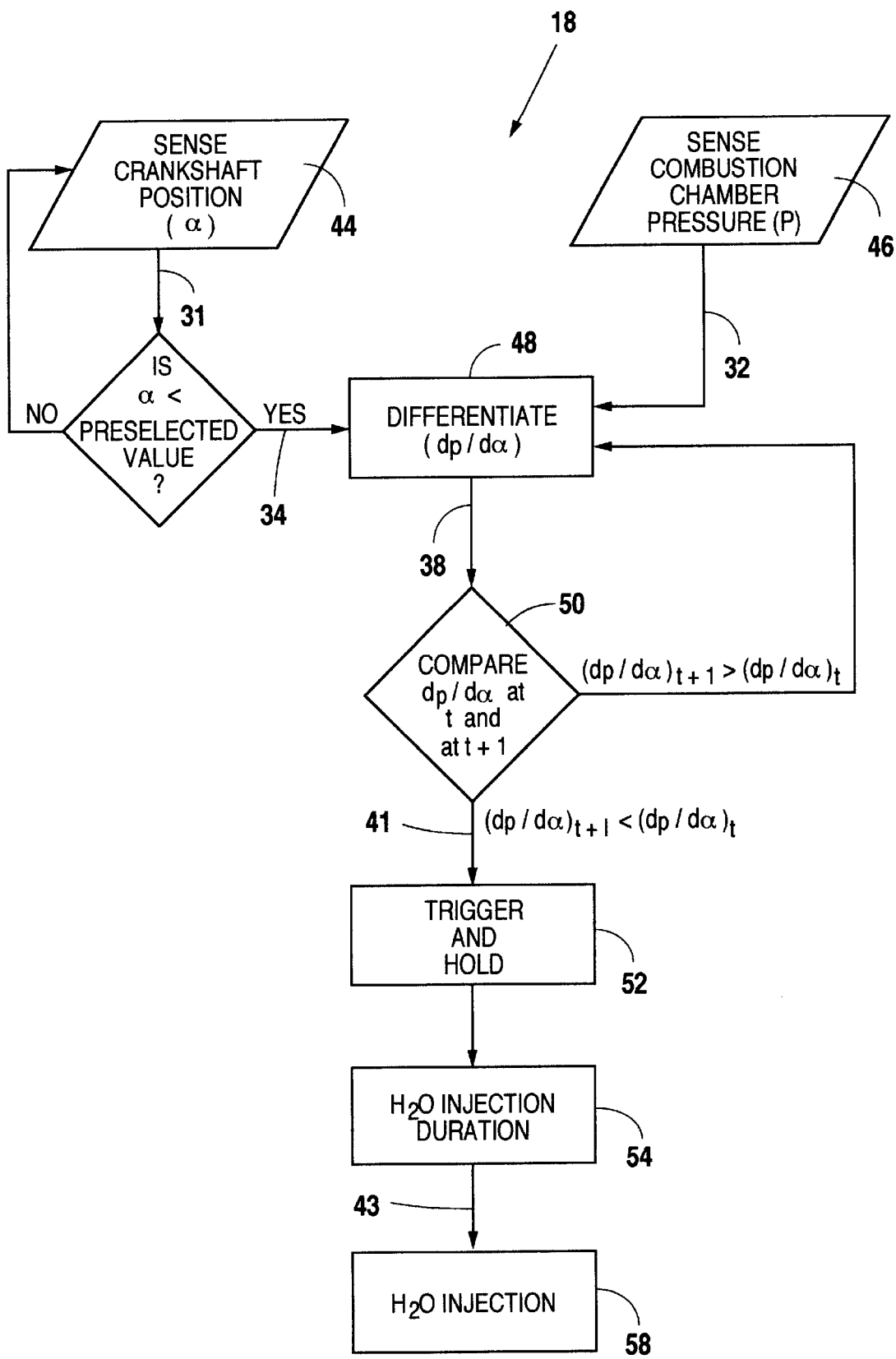
FIG. 3 is a flow diagram of the method for controlling HCCI combustion in accordance with the present invention.

Turning our attention to FIG. 3, the method for controlling HCCI combustion in accordance with the present invention, is indicated by the reference numeral 18. In carrying out the method 18, the crankshaft position angle α is sensed, as represented by block 44 and described above, along with the combustion chamber pressure (p), as represented by block 46. If the crankshaft position angle (α) is less than a preselected value, e.g., 60° BTDC, the signal 34 is delivered to the differentiator 30. The signal 32, representing the sensed combustion chamber pressure, is also delivered to the differentiator 30 whereat the combustion chamber pressure derivative with respect to crankshaft angle $(d_p/d_\alpha)$, is differentiated as represented at block 48. The signal 38, representative of the differentiated value $d_p/d_\alpha$, is then delivered to the comparator 40 whereat the differentiated values at a first time t and at a subsequent time t+1 are compared, as represented at block 50. When the differentiated value at the second time is less than the value at the first time, i.e., $(d_p/d_\alpha)_{t+1} < (d_p/d_\alpha)_t$, the signal 41 is delivered to the trigger 42 which holds the initiation of water injection for a period of time determined by the delay circuit as represented at block 52. The duration of water injection is also determined, as represented at block 54, to delay the start of combustion of the HCCI second stage reaction, as described above. The signal 43 is then delivered to the injectors 56, as illustrated in FIG. 4 and represented by block 58 in FIG. 3.

The method 18, represented by FIG. 3, is continuously repeated so that the injection timing and duration is controlled, preferably during each 720° rotation of the crankshaft.

The method 18 embodying the present invention, injects water into the combustion chamber subsequent to sensing an operating characteristic representative of the first combustion stage. Although the combustion chamber pressure derivative with respect to crankangle $(d_p/d_\alpha)$ is used in the illustrative embodiment, other characteristics of the first stage reaction such as a first anomaly in the sensed pressure derivative with respect to an unfueled motoring pressure derivative, could also be used as the event to control start of the second stage reaction. Thus, it can be seen that the above described method 18 can be advantageously used to control the start of the second (main) stage of HCCI combustion and, consequently, control the heat release rate (HRR) during the second stage of HCCI combustion. The method 18 is therefore particularly useful in extending HCCI combustion to high engine load operating ranges.

Although the invention is described in terms of preferred exemplary embodiments, those skilled in the art will recognize that changes in the illustrated embodiments may be made without departing from the spirit of the invention. Such changes are intended to fall within the scope of the following claims. Other aspects, features, and advantages of the present invention may be obtained from a study of this disclosure and the drawings along with the appended claims.

What we claim is:

1. A method for controlling homogenous charge compression ignition combustion in a diesel engine having a crankshaft, at least one combustion chamber, a water injector in fluid communication with the combustion chamber, and a piston reciprocatively disposed in the combustion chamber and operatively connected to a crankshaft, said method comprising:

sensing pressure in the combustion chamber, said pressure being represented by p;

sensing the angular position of the crankshaft with respect to a top dead center position of the piston disposed in the combustion chamber, said angular position of the crankshaft being represented by α;

calculating a combustion chamber pressure derivative with respect to the crankshaft angle $(d_p/d_\alpha)$ after the crankshaft position angle (α) has a value within a preselected range before a top dead center position of the piston;

comparing the calculated combustion chamber pressure derivative with respect to crankshaft angle $(d_p/d_\alpha)$ at a first time (t), represented by the mathematical expression $(d_p/d_\alpha)_t$, with the calculated combustion chamber pressure derivative with respect to crankshaft angle at a subsequent second time (t+1), represented by the mathematical expression $(d_p/d_\alpha)_{t+1}$;

delivering a signal to a trigger circuit adapted for controlling the injection of water into the combustion chamber in response to the value of $(dp/d\alpha)_{t+1}$ being less than the value of $(dp/d\alpha)_t$, and;

injecting water into said combustion chamber in response to delivering a signal from said trigger circuit to the water injector.

2. The method for controlling homogenous charge compression ignition combustion in a diesel engine, as set forth in claim 1, wherein said method includes delaying said delivering a signal from said trigger circuit to the water injector for a selected period of time subsequent to delivering the signal to the trigger circuit.

3. The method for controlling homogenous charge compression ignition combustion in a diesel engine, as set forth in claim 1, wherein said injecting water into said combustion chamber includes selectively varying the period of time during which water is injected into the combustion chamber.

4. A method for controlling homogenous charge compression ignition combustion in a diesel engine having at least one combustion chamber in which homogenous charge compression ignition combustion occurs in separate first and second combustion stages, said method comprising:

sensing an operating characteristic representative of said first combustion stage; and injecting water into said combustion chamber subsequent to sensing said operating characteristic representative of said first combustion stage at a time and for a length of time sufficient to delay the start of said second combustion stage until a piston disposed in said combustion chamber is at a preselected position, wherein said sensing an operating characteristic representative of said first combustion stage includes sensing combustion chamber pressure with respect to crankshaft angle.

5. A diesel engine adapted for at least partial operation in a homogenous charge compression ignition combustion mode and having at least one combustion chamber, and a piston reciprocatively disposed in said combustion chamber and operatively connected to a crankshaft, said engine comprising:

a means for sensing pressure in said combustion chamber;

a means for sensing crankshaft angle;

a differentiator operatively connected to said means for sensing pressure in the combustion chamber and to said means for sensing crankshaft angle;

a comparator adapted to receive a signal from said differentiator;

a trigger circuit adapted to receive a signal from said second comparator; and an injector operatively connected to a source of water and adapted to inject water into said combustion chamber of the engine in response to receiving a signal from said trigger circuit.

6. The diesel engine, as set forth in claim 5, wherein said engine includes an additional comparator adapted to receive a signal from said means for sensing crankshaft angle and delivering a signal to said differentiator in response to the crankshaft angle having a value within a preselected range.

7. The diesel engine, as set forth in claim 5, wherein said trigger circuit includes a signal output delay circuit.

8. The diesel engine, as set forth in claim 5, wherein said trigger circuit includes an injection duration circuit.

* * * * *